J. WOODWARD.
Grain Drill.
No. 5,460.
Patented Feb. 29, 1848.
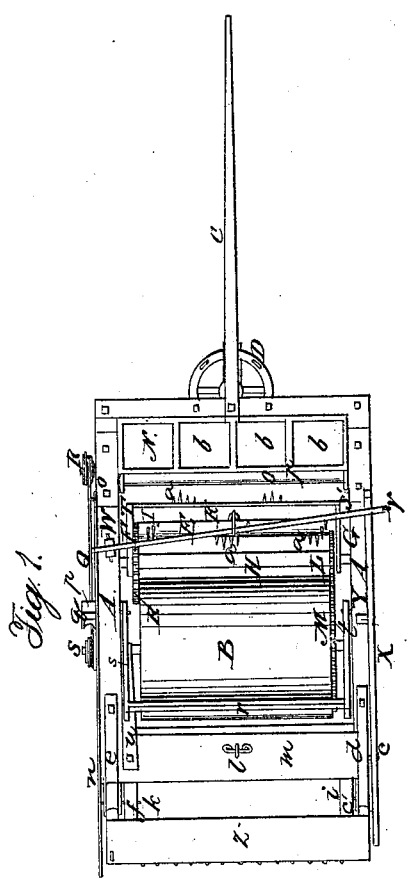
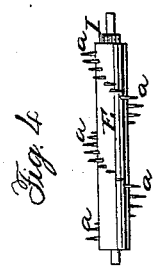
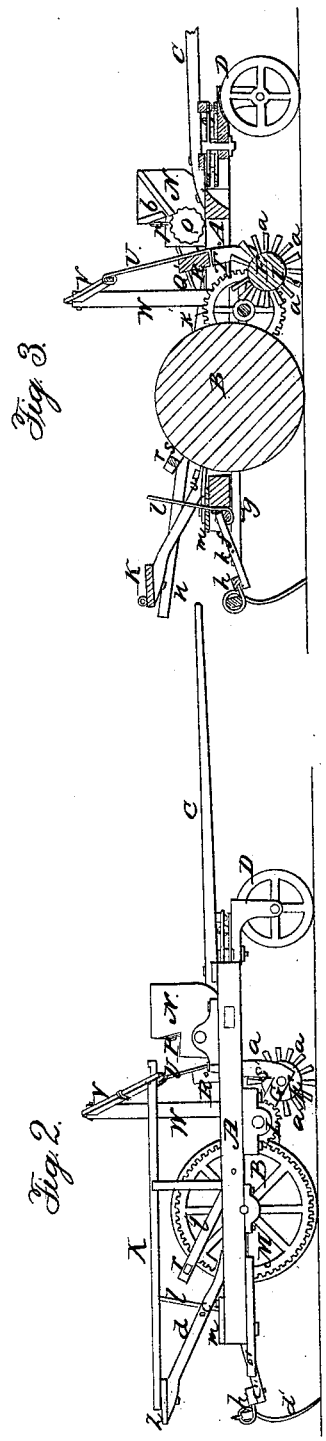
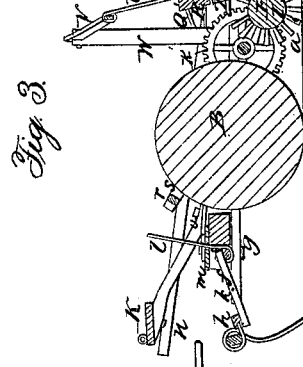

UNITED STATES PATENT OFFICE.

JOSHUA WOODWARD, OF HAVERHILL, NEW HAMPSHIRE.

IMPROVEMENT IN SEED-PLANTING MACHINES.

Specification forming part of Letters Patent No. 5,460, dated February 29, 1848.

*To all whom it may concern:*

Be it known that I, JOSHUA WOODWARD, of Haverhill, in the county of Grafton and State of New Hampshire, have invented a certain new and useful Agricultural Implement which I term a "Pulverizer and Seed-Sower;" and I do hereby declare that the same is fully described and represented in the following specification and accompanying drawings, letters, figures, and references thereof.

Of said drawings, Figure 1 represents a top view of my said machine or agricultural implement. Fig. 2 is a side elevation of it. Fig. 3 is a vertical, central, and longitudinal section of it; and Fig. 4 is a view of the pulverizing-cylinder as detached from the machine.

In said drawings, A denotes the main frame, to which the operative parts of the mechanism are connected.

B is a large roller or cylinder arranged within the frame A, as seen in the drawings, and being confined to the former by journals and boxes, which will permit of the rotation of the cylinder when the frame is drawn forward by horses or oxen applied to a pole, C, extending forward from the front end of the frame.

D is a swivel or caster-wheel applied under the front end of the frame, and made to operate substantially in all respects like a common chair or furniture caster. It is intended to support the front end of the machine.

Directly in front of the roller B is what I term the "pulverizing-cylinder" E. It consists of a cylinder of wood, having a series of knives, *a a*, &c., projecting radially from it, and arranged in a helical curve around it, from one end to the other end of it, as seen in the drawings. The journals projecting from the ends of said cylinder are supported by and revolve in bearings formed in the ends of two arms, F G, which rest and turn at their other or rear ends on a transverse shaft, H. A small toothed pinion, I, (seen in red lines in Fig. 3,) is fixed on the end of the cylinder E. It engages with a cogged wheel, K, fixed on the shaft H, near one end of it, as seen in Figs. 1 and 3. At or near the opposite end of the shaft is a cogged wheel, L, fixed on the shaft, and made to engage with a cogged wheel, M, applied to the shaft or end of the roller or cylinder B. By the afore-described train of gears the pulverizing-cylinder will be put in revolution when the roller is rolled on the ground. Over and in front of the said pulverizing-cylinder I place a seed-sower, which consists of a box, hopper, or trough, N, (divided into any suitable number of compartments, *b b*, &c.,) and a fluted dropping-cylinder, O, placed beneath it, as seen in the drawings.

In rear of the hopper, and resting on the top of the cylinder O, is a long brush, P, which should extend from one end of the dropping-cylinder to the other, and rest on the entire surface of it. The said fluted cylinder is put in revolution by a crossed band, Q, which plays on two systems of cone-pulleys, R S, the former being fixed on the shaft of the dropping-cylinder O, as seen in Figs. 1 and 3. The pulverizer-cylinder is made so as to be elevated and depressed or raised above the ground when the machine is not at work, and lowered down upon it when it is to be put in action. This is effected in the following manner: R' is a heavy cross-bar supported over the pulverizing-cylinder by two arms, S' T, which respectively project upward from the arms E G, before described. From the central part of the said cross-bar a cord or chain, U, extends upward, and is fastened to a lever, V, placed above the cross-bar, and turning at one end on a fulcrum at the top of a post, W, the said fulcrum being arranged or made so as to admit of the lever being raised up and lowered down, as circumstances may require. The said lever is jointed at its opposite end to a hand-lever, X, arranged as seen in the drawings, and which turns on a fulcrum in the top of a post, U.

Z is the seat on which the conductor of the machine sits while it is in operation.

The hand-lever X is arranged so as to be convenient for him to take hold of in order to depress it under a pin, C, projecting from one of the springs *d e* of the seat Z, and by so doing he raises the pulverizing-cylinder above the surface of the soil.

Directly in rear of the main roller B, and below the seat Z, I arrange a rake, *d'*, the head of which is to be attached to the two levers *e f*, which are connected by cross-bars *g h*, and move on fulcra *i k*, in such manner as to enable a person on depressing their front ends to lift up the rake or raise it off the surface of the ground. A depressing-rod, *l*, extends upward from the middle part of the cross-bar *g*, and so as to come up through the foot-board *m* and between the feet of the conductor, or be convenient for him to lay hold of when necessary to raise or depress the rake.

The depressing-rod should have suitable contrivances for holding up the rake applied to it and the foot-board.

A lever, $n$, turning on a fulcrum at $o$, has an arm, P, projecting downward from it. In the lower end of said arm is a roller, $q$, which is made to bear on the cord or band Q, so as to tighten it on the cone-pulleys on which it rests, in order to give motion to the dropping-cylinder. On raising the roller off the band the band should run so loose as not to move the dropping-cylinder of the seed-sower.

A scraper, $r$, is arranged in the position with respect to the main roller as seen in the drawings. It is affixed to two arms, $s\,t$, which turn on fulcra at their lower ends, and are pressed upward by a spring, $u$, acting against the under side of one of them. The said spring serves to elevate the scraper $r$ off the surface of the roller. The scraper is a bar or plate of metal or other proper material, and whenever any improper quantity of earth adheres to the roller B the conductor places his foot on the scraper, and depresses it down upon the surface of the roller in such manner as to cause the removal of the earth by it while the roller revolves.

In the use of my machine the seeds are first dropped (by the sowing apparatus) in front of the pulverizer, which, being put in motion, cuts into and slices up the soil, together with any tufts or bunches of grass or roots, and mixes the sods with the soil so cut. The roller B, following immediately after, rolls down and compacts the soil, which is afterward subjected to the operation of the rake in rear of the said roller. The rake raises up the tufts or bunches of roots in such manner as to expose them to the action of the air, sun, or rain, in order that their blades of grass may be destroyed thereby. My machine is peculiarly adapted to soils which have been overrun or partially overrun with what is termed "porter's grass" or "knot-grass" or "dog-grass," which is very destructive to grain-fields. My machine, however, is applicable to other soils, or to those not so impaired.

I claim as my invention—

The combination of the said dropping apparatus, the rotating pulverizing-cylinder of knives, the main roller B, and the rake in rear of the same, the same being arranged and operating together, substantially as above specified.

In testimony whereof I have hereto set my signature this 10th day of March, A. D. 1847.

JOSHUA WOODWARD.

Witnesses:
CHARLES E. THOMPSON,
HENRY TAWLE.